April 28, 1964 P. J. ALDRIDGE 3,130,935

SOUND REPRODUCING AND RECORDING APPARATUS

Filed Jan. 18, 1963 4 Sheets-Sheet 1

Inventor
P.J. Aldridge
By
Holcombe, Wetherill & Brisebois
Attorneys

April 28, 1964 P. J. ALDRIDGE 3,130,935

SOUND REPRODUCING AND RECORDING APPARATUS

Filed Jan. 18, 1963 4 Sheets-Sheet 2

Inventor

P. J. Aldridge

By Holcombe, Wetherill & Brisebois

Attorneys

April 28, 1964 P. J. ALDRIDGE 3,130,935

SOUND REPRODUCING AND RECORDING APPARATUS

Filed Jan. 18, 1963 4 Sheets-Sheet 3

Inventor
P. J. Aldridge
By Holcombe, Wetherill & Brisebois
Attorneys

Inventor
P. J. Aldridge
By Holcombe, Wetherill & Brisebois
Attorneys

United States Patent Office 3,130,935
Patented Apr. 28, 1964

3,130,935
SOUND REPRODUCING AND RECORDING APPARATUS

Peter John Aldridge, Ainsdale Boundary Road, Upminster, England

Filed Jan. 18, 1963, Ser. No. 252,499
Claims priority, application Great Britain Feb. 1, 1962
5 Claims. (Cl. 242—55.12)

In most tape recorders and tape decks it is usual to provide three different drives for the tape. The first drive is the normal wind on of the tape from one reel to the other at a speed at which either a recording is made or a recording is played back. In some machines this speed may be varied. In addition to this there is also, however, a high speed wind on of the tape from one reel to the other in the direction in which the tape travels when recording or playing back. This is to enable a part of the tape at some distance from one end to be reached quickly. The third drive is a high speed rewind back on to the reel from which the tape starts.

It is very important that only one of these drives should be able to be engaged at any one time, otherwise severe damage may result to either the mechanism or the tape or both. Some form of interlock must, therefore, be provided for preventing the engagement of either of the other two drives as soon as one of the drives has been engaged.

According to the present invention, the three drives are each engaged and disengaged by movement of a different one of three separate members, each of which has a projection which engages in a slot in an interlock plate, the slots being so arranged that movement of any one of the members to engage one of the drives causes edge surfaces of the plate in engagement with the projections on the other members to prevent movement of these other members to engage either of the other drives. Neither of the other drives can therefore be engaged until the first member is moved back again to disengage its drive.

The three members may be bars which are guided to move in their longitudinal directions to engage and disengage the drives and the corresponding movement of one or more of the projections along their slots in the interlock plate moves the plate to bring lateral edge surfaces of the plate into engagement with the other projections to prevent their movements in their slots. The guiding of the bars so that they can only move longitudinally is preferably brought about by three slots in a fixed plate. The projections engage in these slots as well as in the slots in the interlock plate and can therefore only move in the direction of these slots.

The tape reel holders of the tape deck or tape recorder may, as is usual, have brakes which bring them to a standstill whenever all the tape drives are disengaged. These brakes are preferably applied by a spring and each of the parallel bars has a projection which, when the bar is moved to engage the drive, comes into engagement with and rocks a lever which releases the brakes. The high-speed wind-on and the high-speed rewind of the tape may be brought about through clutches, one of which engages the drive to one tape reel for the wind-on and the other of which engages a drive to the other tape reel for the rewind. These clutches may be engaged and disengaged by cams on a bar which is fixed to the interlock plate and the cams are operated by the lateral movement of the plate.

An example of a tape recorder constructed in accordance with the invention is illustrated in the accompanying drawings, in which.

Figure 1:
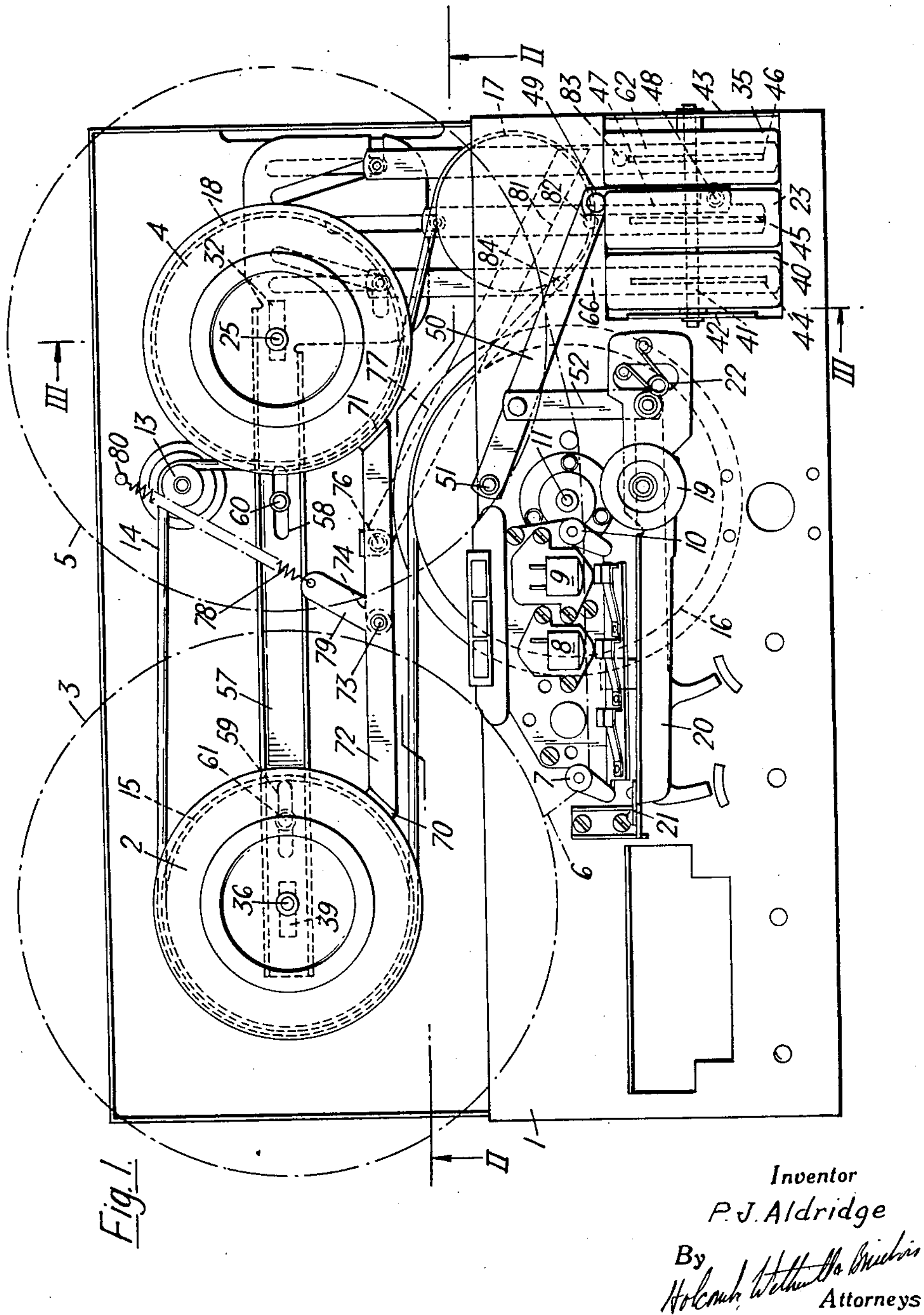
FIGURE 1 is a plan.

The tape mechanism has a base plate 1 forming a chassis on which the other parts are mounted. These include a tape reel holder 2 for holding a tape reel indicated in chain dotted lines 3 and a second tape reel holder 4 for holding a tape reel indicated in chain dotted lines at 5. A tape 6 shown in chain dotted ilnes in FIGURE 1 is in the course of recording or playing back, unwound from the reel 3 and wound on to the reel 5. In its path between the two reels the tape passes around a guide 7, over an erasing head 8, a recording and play-back head 9, a second guide 10 and a rotating capstan 11.

The tape reel holders 2 and 4 and the capstan 11 are driven by an electric motor 12 (see FIGURE 2) which has a driving pulley 13 around which a belt 14 passes. The general features of the tape drive are described in our co-pending application S.N. 241,874. In brief, the belt 14 passes round a driving pulley 15 which is connected to the reel holder 2 through a clutch, around a second driving pulley 16, which is directly fixed to a spindle carrying the capstan 11, around a tensioning jockey pulley 17 and around a third driving pulley 18 which is connected to the reel holder 4 through a second clutch similar to the clutch between the driving pulley 15 and the reel holder 2. When the normal recording and play-back drive is engaged, the tape 6 is pressed against the periphery of the capstan 11 by a pressure roller 19 which is mounted on an arm 20 which can swing to and fro in a horizontal plane about a hinge 21. In FIGURE 1, the pressure roller 19 is shown withdrawn and to engage it the arm 20 is swung in a counter-clockwise direction and the pressure roller 19 is then urged against the tape, to sandwich the tape between itself and the periphery of the capstan 11 by a spring 22. The movement of the arm 20 to engage and disengage the pressure roller 19 and the tape is brough about by a control button 23.

Figure 3:
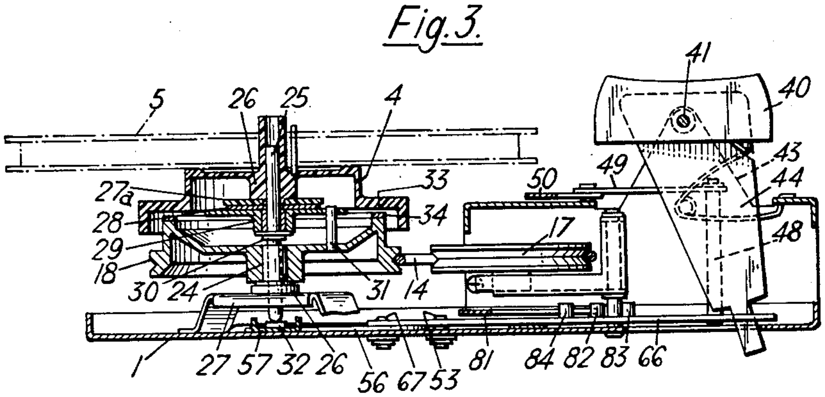
FIGURE 3 is a section as seen in the direction of the arrows on the line 3—3 in FIGURE 1.

As shown in FIGURE 3 of the drawings, the driving wheel 18 is fixed on a sleeve 24 which is rotatably mounted on a spindle 25 which is movable upwards and downwards in a bearing 26 fixed to a bracket 27 carried from the base plate 1. The reel holder 4 is rotatably mounted on the spindle 25 and has a boss 26 to the underside of which a plastic washer 27*a* is fixed. The reel holder 4 is supported in a vertical direction by the plastic washer 27*a* bearing on a felt washer 28 which in turn rests on a driving ring 29 supported on a collar 30 fixed to the spindle 25. The reel driving pulley 18 has an upwardly projecting pin 31 which engages in a hole in the driving wheel 29 and thus rotation of the driving pulley 18 is transmitted to the driving wheel 29 and thence through the felt washer 28 and the plastic washer 27*a* to the tape reel holder 4. The frictional torque between the plastic washer 27*a* and the felt washer 28 is only small and therefore the drive can slip very easily. When the tape is being driven through the tape recorder by the capstan 11 during normal recording or playing back, the rotation of the reel holder 4 is sufficient to take up the tape and as the diameter of the coil of tape on the reel 5 increases the drive slips to an increasing extent.

The lower end of the spindle 25 rests on a cam 32 and withdrawal of this cam lowers the spindle 25 and with it the collar 30 so that the tape reel holder 4 is also lowered. This brings a face 33 on the underside of the holder 4 into contact with a cork washer 34 fixed to the top surface of the driving pulley 18. The friction between the cork washer 34 and the face 33 is much greater than that between the felt washer 28 and the plastic washer 27*a* and therefore a much larger torque is transmitted to the reel holder 4. There is therefore no slip and the reel holder 4 is rotated in a counterclockwise direction as seen in FIGURE 1 at a higher speed. This high-speed wind-on drive is engaged and disengaged by means of a second control button 35.

Figure 2:
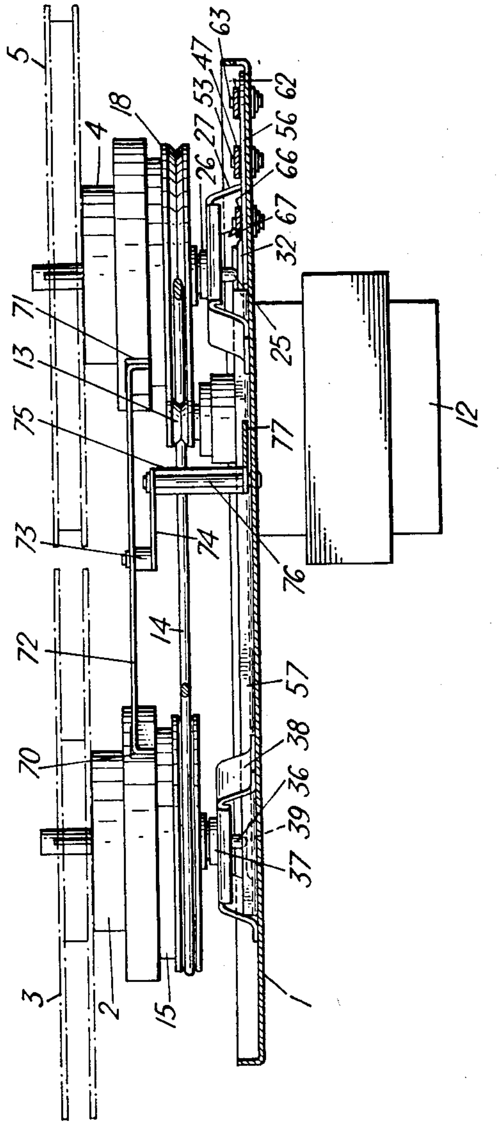
FIGURE 2 is a section as seen in the direction of the arrows on the line 2—2 in FIGURE 1.

As seen in FIGURE 2, the tape reel holder 2 is mounted on a spindle 36 carried in a bearing 37 in a bracket 38 and all these parts are exactly similar to the spindle 25, the bearing 26 and the bracket 27 by which the tape reel holder 4 is carried. Further the tape reel holder 2 is connected to the driving pulley 15 by an internal clutch arrangement exactly similar to that within the tape reel holder 4. This clutch is engaged and disengaged by a cam 39 similar to the cam 32. This cam which engages and disengages a high-speed rewind drive to the tape reel holder 2 is controlled by a third control knob 40.

The controls of the three tape drives of the tape recorder which are operated by the buttons 23, 35 and 40 are constructed and interlocked, so that only one drive can be engaged at once, in the following manner:

All three buttons are exactly similar to each other and all can rock about a horizontal shaft 41 which is pivotally mounted in lugs 42 and 43 (see FIGURE 1). Fixed to, and projecting downward from, each of the buttons is a similar plate 44, 45 and 46. The plate 44 is shown in side elevation in FIGURE 3. The plate 45 which is fixed to the button 23 controlling the normal tape wind for recording and playing back, has its bottom end engaging in a slot in a bar 47. By pressing the top end of the button 23 as seen in FIGURE 1, the button and with it the plate 45 are rocked in a counter-clockwise direction as seen in FIGURE 3 and the bar 47 is moved towards the right as seen in FIGURE 3, that is downwards as seen in FIGURE 1. Pressure on the bottom end (as seen in FIGURE 1) of the button 23 rocks the button and the plate 45 in an opposite direction and moves the bar 47 upwards as seen in FIGURE 1. Projecting upwards from the bar 47 is a pin 48 and pivoted to the top end of this pin is a link 49. The link 49 is pivoted to a lever 50, which has its other end pivoted on a pin 51 which is fixed to the base plate 1. By this mechanism, rocking of the button 23 produces a rocking movement of the lever 50 and this is transmitted through a further link 52 to the arm 20. Pressing of the bottom end (as seen in FIGURE 1) of the button 23 moves the arm 20 upwards to cause the pressure roller 19 to engage the tape and cause it to be driven by the capstan 11 as already described.

Figure 4:
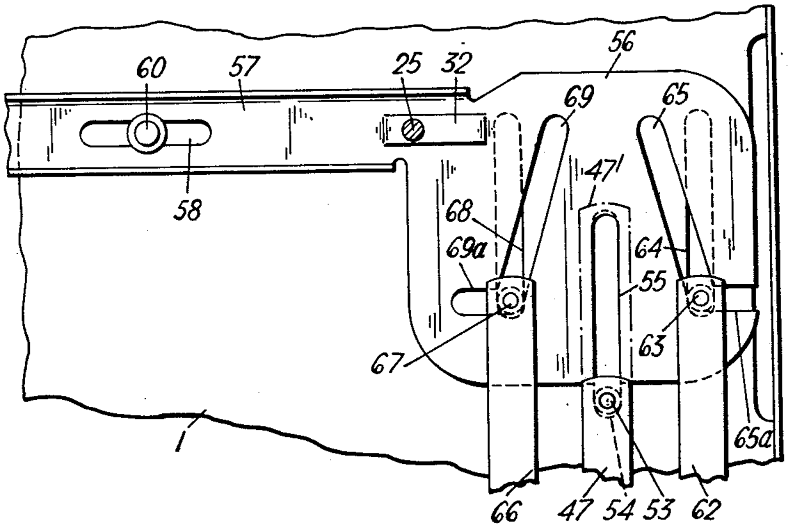
FIGURE 4 is a plan to a larger scale of the interlock plate and the ends of the three control members in the positions which they occupy when all three drives are disengaged.
Figure 5:
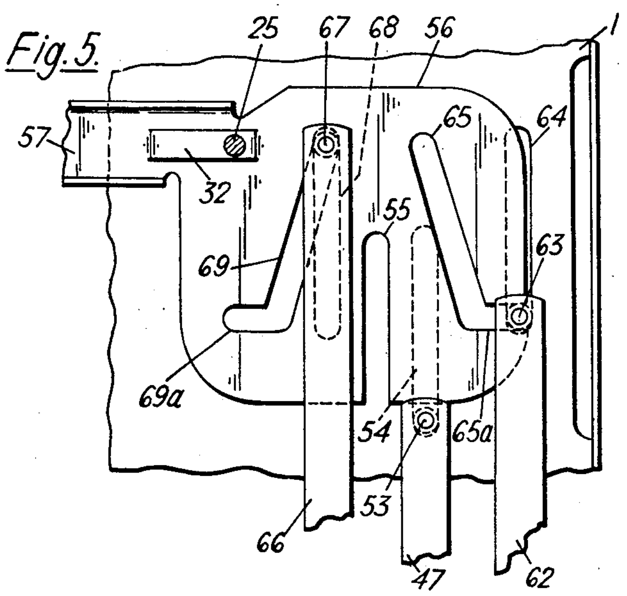
FIGURE 5 is a plan similar to FIGURE 4 but showing the separate members in the positions which they occupy when the high-speed rewind drive is engaged.
Figure 6:
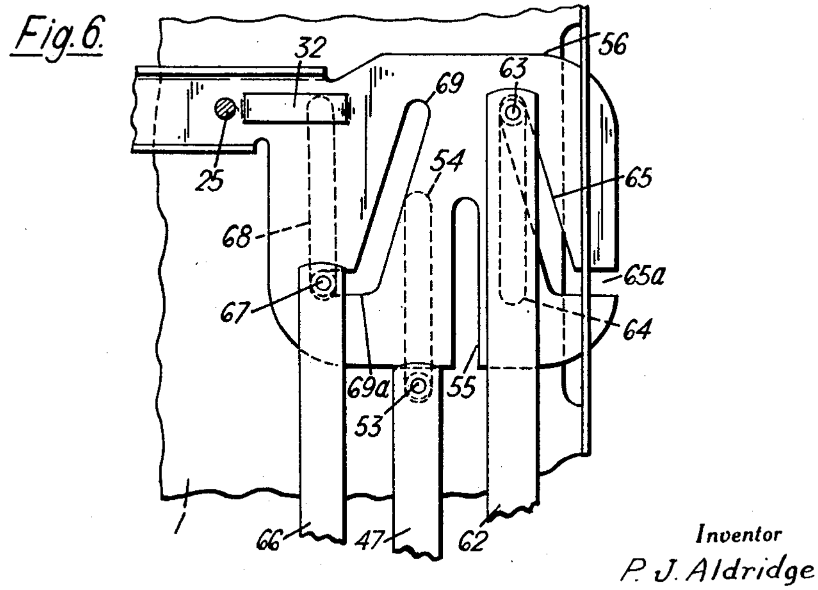
FIGURE 6 is a plan similar to FIGURE 4 but showing the position which the members occupy when the high-speed wind-on drive is engaged.

As shown most clearly in FIGURES 4 to 6 of the drawings, the upper end, as seen in FIGURE 1, of the bar 47 carries a projecting pin 53 which projects downwards through a slot 54 in the base plate 1. When the normal drive to the tape is disengaged, the pin 53 is in the position shown in FIGURE 4 in the slot 54, but when the button 23 is rocked to engage the drive to the tape, the bar 47 moves into the position shown in chain dotted lines at 47′ in FIGURE 4 and the pin 53 slides up the slot 54 and also slides along a slot 55 in an interlock plate 56 which rests on top of the base plate 1. Projecting from the interlock plate 56 is a bar 57 having slots 58 and 59 (see FIGURES 1 and 4) and pins 60 and 61 respectively project upwards from the base plate 1 through these slots. These pin and slot connections guide the plate 56 so that it can only move laterally in a direction at right angles to the slots 54 and 55 that is across the direction of movement of the bar 47. It is apparent from FIGURE 4, that the pin 53 can only slide up and down the slot 54 when the slots 54 and 55 are in register with each other. Movement of the plate 56 either to the left as shown in FIGURE 5 or towards the right as shown in FIGURE 6 causes a portion of the bottom edge of the plate 56 to obstruct the slot 54 and thus prevent movement of the pin 53. This of course also prevents movement of the bar 47 and thus locks the mechanism for moving the arm 20 and engaging the drive of the tape through the capstan 11.

The plate 46 fixed to the knob 35 is connected to a bar 62 in the same way as the plate 45 is connected to the bar 47. Rocking of the knob 37 thus moves the bar 62 upwards or downwards as seen in FIGURE 1. The end of the bar 62 remote from the button 35 has a downwardly projecting pin 63 which passes through a slot 64 in the base plate 1 parallel to the slot 54. The pin 63 also passes through a slot 65 in the plate 56. The main part of the slot 65 is inclined to the direction of the slot 64 and a second part 65*a* of this slot is at right angles to the slot 64.

Rocking of the button 35 in a clockwise direction as seen in FIGURE 3 moves the bar 62 upwards and causes the pin 63 to travel along the slots 64 and 65. This movement causes the plate 56 to move towards the right into the position shown in FIGURE 6 of the drawings. Once this movement has taken place, the bar 47 is prevented from moving by the bottom edge of the plate 56 as already described. The movement of the plate 56 towards the right from the position shown in FIGURE 4 of the drawings to that shown in FIGURE 6, moves the bar 57 as well and also moves the cams 32 and 39 which are fixed on the top surface of the bar 57. The movement of the cam 32 causes the bottom end of the spindle 25 to move down an inclined surface on the cam and thus lowers the reel holder 4. This brings the face 33 into engagement with the cork washer 34 and engages the clutch for the high-speed wind-on of the tape, onto the reel 5 on the holder 4. The movement of the cam 39, however, only causes the bottom end of the spindle 36 to move along a horizontal portion of the cam and therefore the clutch within the reel holder 2 is not engaged.

Engagement of the clutch within the reel holder 2 to engage the high-speed rewind drive, is brought about by the knob 40. Rocking of this knob in a clockwise direction as seen in FIGURE 3 of the drawings, causes a bar 66 parallel to the bars 47 and 62 to be moved upwards as seen in FIGURE 1, that is towards the left seen in FIGURE 3. The end of the bar 66 remote from the button 40 has a pin 67 engaging in a slot 68 in the base plate 1 and a second slot 69 in the interlock plate 56. The slot 69 has its main portion inclined to the slot 68 in an opposite direction to that in which the slot 65 is inclined to the slot 64. The slot 69 has a further portion 69*a* parallel to the slot 65*a*.

Movement of the bar 66 by rocking the button 40 from the position shown in FIGURE 4 of the drawings to that shown in FIGURE 5 of the drawings causes the plate 56 to move towards the left and this again moves the cams 32 and 39. Movement of the two cams in this direction causes the cam 39 to lower the spindle 36 and with it the reel holder 2 to engage the clutch within this reel holder and transmit the high-speed rewind drive to the reel 3. The movement of the cam 32 is, in this case, idle and the clutch within the reel holder 4 remains disengaged.

Movement of the plate 56 into the position shown in FIGURE 5 also prevents movement of the bar 47 taking place thereafter as already described, and it causes the pin 63 to move into the portion 65*a* of the slot 65 in the plate 56. The upper edge of the slot portion 65*a* therefore prevents the pin 63 moving in the slot 64 and thus locks the mechanism for engaging the high-speed wind-on drive. When this drive is engaged as already described and the plate 56 is moved into the position shown in FIGURE 6 of the drawings, the pin 67 moves into the portion 69*a* of the slot 69 and this in turn prevents movement of the bar 66 and engagement of the rewind drive.

In addition to controlling the engagement of the various drives, the buttons 23, 35 and 40 all also control brakes on the reel holders 2 and 4. The brakes which are shown in FIGURES 1 and 2 of the drawings, consist of cork pads 70 and 71 which bear against the outsides of the reel holders 2 and 4 respectively. The pads 70 and 71 are carried one on each end of a metal strip 72 which is pivoted on a pin 73 at the end of an arm 74. The arm 74 is rigidly fixed to a column 75 which is rotatably mounted on a pin 76 projecting upwards from the base plate 1. Also rigidly fixed to the column 75, at its bottom, is a further arm 77. The arms 74 and 77 and the connecting column 75 between them together form a bell crank lever.

The brake pads 70 and 71 are normally held against their respective reel holders, so that the brakes are applied, by a tension spring 78 which is connected to the pin 73 by a link 79 at one end, and has its other end anchored to a pin 80 projecting upwards from the base plate 1. The spring 78 tends to rotate the bell crank lever formed by the arm 74 and 77 and the column 75 in a clockwise direction about the pin 76. The right hand end 81 (as seen in FIGURE 1) of the arm 77 extends across and in contact with the top surfaces of the bars 47, 62 and 66. These bars have pins 82, 83 and 84 respectively projecting upwards from them adjacent the edge of the right hand end 81 of the arm 77 and when any one of the bars 47, 62, or 66 moves upwards as seen in FIGURE 1 of the drawings, to engage its drive, the pin attached to it comes into contact with the edge of the right hand portion 81 of the arm 77 and rocks the arm 77 in a counter-clockwise direction about the pin 76. This movement swings the arm 74 downwards and moves the strip 72 and with it the brake pads 70 and 71 downwards against the action of the spring 78 to release the brakes. At any time when all the drives to the tape are disengaged, the brake pads 70 and 71 are automatically applied to the reel holders 2 and 4 by the spring 78.

I claim:

1. In tape sound reproducing apparatus comprising first and second tape reels, a driving motor and three different drive transmissions for transferring tape from one of said reels to the other, the improvement which comprises means for engaging and disengaging each of said drive transmissions, said means including first, second and third control members, means operatively connecting each of said control members to a different one of said drive transmissions whereby movement of one of said control members in one direction engages one of said drive transmissions and movement of said control member in an opposite direction disengages said drive transmission, a projection on each of said control members, an interlock plate having three slots, each of said projections operatively engaging in one of said slots, edge surfaces on said plate and means for moving each one of said control members individually, said slots being so arranged that movement of any one of said control members in a direction to engage one of said drive transmissions causes said edge surfaces in engagement with the projections on the other control members to prevent movement of these other control members in said one direction to engage either of the others of said drive transmissions.

2. Apparatus as claimed in claim 1, wherein said first, second and third control members are bars, and further comprising means for guiding said bars to move in their longitudinal directions to engage and disengage said drive transmissions and to cause said projections to move along said slots in said interlock plate, said movement of at least one of said projections causing movement of said plate to bring said edge surfaces of said plate into engagement with the others of said projections to prevent said other projections moving in said slots.

3. Apparatus as claimed in claim 2, wherein said guiding means comprises a fixed plate having slots, said projections engaging in said slots.

4. Apparatus as claimed in claim 1 further comprising first and second holders for said first and second tape reels, a brake for each of said holders, a spring for applying said brake, a further projection on each of said control members and means operatively interconnecting said further projections and said brakes, whereby, when any one of said control members is moved in a direction to engage one of said drive transmissions, said further projection on said control member releases said brakes against the action of said spring.

5. Apparatus as claimed in claim 1, wherein one of said drive transmissions is a high-speed wind-on from said first reel to said second reel and includes a first clutch and another of said drive transmissions is a high-speed re-wind from said second reel to said first reel and includes a second clutch, first and second cams, first and second means including cam follower means connecting said cams to said clutches for engaging and disengaging said clutches and means connecting said cams to said interlock plate, whereby movement of said interlock plate in one direction causes said first cam to cause said first clutch to be engaged and movement of said interlock plate in an opposite direction causes said second cam to cause said second clutch to be engaged.

References Cited in the file of this patent

UNITED STATES PATENTS

| | | |
|---|---|---|
| 2,813,686 | Schroter | Nov. 19, 1957 |
| 2,985,395 | Hoehn et al. | May 23, 1961 |

UNITED STATES PATENT OFFICE

CERTIFICATE OF CORRECTION

Patent No. 3,130,935 April 28, 1964

Peter John Aldridge

It is hereby certified that error appears in the above numbered patent requiring correction and that the said Letters Patent should read as corrected below.

In the grant, lines 1 to 3, for "Peter John Aldridge, of Upminster, England," read -- Peter John Aldridge, of Upminster, England, assignor to Magnavox Electronics Company Limited, of Barking, Essex, England, a British Company, --; line 12, for "Peter John Aldridge, his heirs" read -- Magnavox Electronics Company Limited, its successors --; in the heading to the printed specification, lines 4 and 5, for "Peter John Aldridge, Ainsdale Boundary Road, Upminster, England" read -- Peter John Aldridge, Upminster, England, assignor to Magnavox Electronics Company Limited, Barking, Essex, England, a British company --.

Signed and sealed this 11th day of August 1964.

(SEAL)
Attest:

ERNEST W. SWIDER
Attesting Officer

EDWARD J. BRENNER
Commissioner of Patents